US012776078B2

(12) United States Patent
Myers

(10) Patent No.: US 12,776,078 B2
(45) **Date of Patent: *Oct. 27, 2026**

(54) CONNECTING OVERLAPPING LINE SEGMENTS IN A TWO-DIMENSIONAL VIEW

(71) Applicant: Procore Technologies, Inc., Carpinteria, CA (US)

(72) Inventor: Christopher Myers, Council, ID (US)

(73) Assignee: Procore Technologies, Inc., Carpinteria, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/987,204

(22) Filed: Dec. 19, 2024

(65) Prior Publication Data

US 2025/0209692 A1 Jun. 26, 2025

Related U.S. Application Data

(63) Continuation of application No. 18/400,100, filed on Dec. 29, 2023, now Pat. No. 12,175,567, which is a continuation of application No. 17/592,278, filed on Feb. 3, 2022, now Pat. No. 11,893,664.

(51) Int. Cl.
*G06T 11/23* (2026.01)

(52) U.S. Cl.
CPC .......... *G06T 11/23* (2026.01); *G06T 2210/04* (2013.01)

(58) Field of Classification Search
None
See application file for complete search history.

(56) References Cited

U.S. PATENT DOCUMENTS

| | | | | |
|---|---|---|---|---|
| 2009/0018685 | A1* | 1/2009 | Holzwarth | G06F 30/13 700/98 |
| 2014/0125671 | A1 | 5/2014 | Vorobyov et al. | |
| 2017/0316115 | A1 | 11/2017 | Lewis et al. | |
| 2020/0265121 | A1 | 8/2020 | Myers et al. | |
| 2020/0388059 | A1 | 12/2020 | Hartfiel et al. | |

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

*Primary Examiner* — Jeffrey J Chow
(74) *Attorney, Agent, or Firm* — Lee Sullivan Shea & Smith LLP

(57) ABSTRACT

An example computing device is configured to (i) generate a cross-sectional view of a three-dimensional drawing file, the cross-sectional view including an object corresponding to a given mesh of the three-dimensional drawing file, the object including a void contained within the object, (ii) determine a plurality of two-dimensional line segments that collectively define a boundary of the void, (iii) for each line segment, determine nearby line segments based on a distance between an end point of the line segment and an end point of the one or more nearby line segments being within a threshold distance, (iv) determine one or more fully-connected sub-objects by connecting respective sets of nearby line segments in series, (v) determine, from the fully-connected sub-objects, a final sub-object to be used as a new boundary of the void, and (vi) add the final sub-object to the cross-sectional view as the new boundary of the void.

20 Claims, 7 Drawing Sheets

CONNECTING OVERLAPPING LINE SEGMENTS IN A TWO-DIMENSIONAL VIEW

CROSS-REFERENCE TO RELATED APPLICATIONS

This application is a continuation of U.S. application Ser. No. 18/400,100, filed on Dec. 29, 2023, and titled "Connecting Overlapping Line Segments in a Two-Dimensional View," which is a continuation of U.S. application Ser. No. 17/592,278, filed on Feb. 3, 2022, issued as U.S. Pat. No. 11,893,664, and titled "Connecting Overlapping Line Segments in a Two-Dimensional View," the contents of each of which are incorporated by reference herein in their entirety.

BACKGROUND

Construction projects are often complex endeavors involving the coordination of many professionals across several discrete phases. Typically, a construction project commences with a design phase, where architects design the overall shape and layout of a construction project, such as a building. Next, engineers engage in a planning phase where they take the architects' designs and produce engineering drawings and plans for the construction of the project. At this stage, engineers may also design various portions of the project's infrastructure, such as HVAC, plumbing, electrical, etc., and produce plans reflecting these designs as well. After, or perhaps in conjunction with, the planning phase, contractors may engage in a logistics phase to review these plans and begin to allocate various resources to the project, including determining what materials to purchase, scheduling delivery, and developing a plan for carrying out the actual construction of the project. Finally, during the construction phase, construction professionals begin to construct the project based on the finalized plans.

OVERVIEW

As a general matter, one phase of a construction project involves the creation, review, and sometimes revision, of plans of the construction project. In most cases, these plans comprise visual representations of the construction project that visually communicate information about the construction project, such as how to assemble or construct the project. Such visual representations tend to take one of at least two different forms. One form may be a two-dimensional technical drawing, such as an architectural drawing or a construction blueprint, in which two-dimensional line segments of the drawing represent certain physical elements of the construction project like walls and ducts. In this respect, a two-dimensional technical drawing could be embodied either in paper form or in a computerized form, such as an image file (e.g., a PDF, JPEG, etc.).

Two-dimensional technical drawings have advantages. For instance, they are often set out in a universally recognized format that most, if not all, construction professionals can read and understand. Further, they are designed to be relatively compact, with one drawing being arranged to fit on a single piece of paper or in a computerized file format that requires minimal processing power and computer storage to view (e.g., a PDF viewer, JPEG viewer, etc.). Yet, two-dimensional drawings have disadvantages as well. For instance, it often takes multiple drawings in order to visually communicate an overview of an entire construction project. This is because two-dimensional drawings tend not to efficiently present information about the construction project from a third (e.g., vertical) dimension. For example, a construction project may have at least one two-dimensional technical drawing per floor of the construction project. Thus, for a construction project spanning, say, ten floors, the construction project will have at least ten two-dimensional technical drawings, and likely more to fully visually communicate the various aspects of the construction project.

To advance over two-dimensional technical drawings, computerized, three-dimensional technology was developed as another form in which information about a construction project can be visually communicated. In this respect, a three-dimensional model of the construction project would be embodied in a computerized form, such as in a building information model (BIM) file, with three-dimensional meshes visually representing the physical elements of the construction project (e.g., walls, ducts, etc.). Specialized software is configured to access the BIM file and render a three-dimensional view of the construction project from one or more perspectives. This provides some advantages over two-dimensional technical drawings, namely that a construction professional may get a more complete overview of the construction project based on a single three-dimensional view and thus may not have to shuffle through multiple two-dimensional drawings in order to conceptualize what the construction project looks like. In addition, the specialized software allows a construction professional to navigate throughout the three-dimensional view of the BIM file and focus on elements of interest in the construction project, such as a particular wall or duct.

However, existing technology for presenting visual representations of construction projects has several limitations. For example, one such limitation is that existing software tools for rendering three-dimensional views of construction projects do not provide all the information about a construction project that may be available on certain two-dimensional technical drawings. For instance, dimensioning information for certain physical elements of a construction project may not be presented on a three-dimensional view of a construction project as doing so may clutter or obscure the three-dimensional presentation. Such information is more aptly displayed on an appropriate two-dimensional drawing.

Yet another limitation with existing technology for presenting visual representations of construction projects is that, in some situations, neither a two-dimensional technical drawing nor a three-dimensional view readily provides the particular information about the construction project that is needed. For instance, consider a scenario where construction plans call for a plumbing layout that includes a pipe passing through a wall. A construction professional that is installing the wall-before the pipe is present-might wish to locate the intersection between the wall and the eventual pipe so as to create a penetration through the wall in the correct location. The horizontal and/or vertical dimensioning information for doing so might not be included on any two-dimensional technical drawings or in any two-dimensional views of a BIM file.

In scenarios like these, the construction professional would typically derive this information based on his or her own calculations, accounting for, among other things, the dimensions of the pipe, the designed pitch of the pipe, if any, and the distance of the pipe/wall intersection from another point where the vertical elevation of the pipe is known. Such manual calculations can be time-consuming, can create the possibility for errors, both of which are issues that are multiplied with each calculation that must be performed.

Some solutions have been developed to assist construction professionals with obtaining this type of desired information from a three-dimensional BIM file. For instance, some software tools allow a construction professional to generate a two-dimensional, cross-sectional view of a three-dimensional drawing file along a plane (e.g., a wall, a floor, etc.) of the construction professional's choosing. This may allow the construction professional to visualize the intersections between various meshes (e.g., objects such as pipes, doors, etc.) within the three-dimensional drawing file at a particular location. Further, the software tool that facilitates the creation of this type of cross-sectional view will also typically be configured to provide dimensioning information between the unique objects that are represented within the cross-sectional view by creating a bounding rectangle around each object, which may provide the basis for selecting and measuring to the edges and/or center of each object.

Nonetheless, there are still some shortcomings associated with this type of approach. As noted above, certain objects within a three-dimensional drawing file such as a wall (or a floor, etc.) may be designed such that one or more other objects passes through it, or otherwise interrupts the continuous surface of the wall. These locations may appear as holes or voids within the cross-sectional view of the wall. However, because the voids are a part of the same mesh that forms the overall wall object, current software tools for generating the cross-sectional view will treat the wall and all of its voids as a single object. As a result, current software tools will create a single rectangular bounding box that coincides with the extents of the wall object, effectively ignoring the voids within the interior portions of the wall. Consequently, the voids are not selectable as separate objects within the cross-sectional view and current software tools are unable to generate dimensioning information related to these types of voids. Thus, a construction professional may need to resort to manually calculating the locations for such voids, as discussed above.

To address these and other shortcomings associated with current solutions, disclosed herein is a new technology that facilitates the creation of a cross-sectional view from a three-dimensional drawing file such that voids within an object, such as voids in a wall or floor, are represented as separate objects that can be selected and dimensioned within the cross-sectional view. This may greatly improve a construction professional's ability to quickly and accurately obtain desired dimensioning information from cross-sectional views that are generated based on a three-dimensional drawing file.

At a high level, the disclosed technology may involve a computing device tracing a three-dimensional drawing file along a plane to generate a cross-sectional view of the three-dimensional drawing file. As a result of this process, any void in a given object (e.g., a void in a wall or floor) will generally be represented in the cross-sectional view as a plurality of overlapping, fragmented line segments of varying length (e.g., the traced portions of the mesh defining the wall or floor) that collectively define a boundary of the void. The computing device may analyze the plurality of line segments to determine which line segments are near each other and may be linked in a set of set of connected line segments that form a continuous sub-object that defines a new boundary for the void. Based on the new boundary, the void may become selectable within the cross-sectional view such that dimensioning information may be associated with the void. Each of these operations, which may take various forms and may be carried out in various manners, are described in further detail below.

Accordingly, in one aspect, disclosed herein is a method that involves (1) generating a cross-sectional view of a three-dimensional drawing file, wherein the cross-sectional view comprises an object corresponding to a given mesh of the three-dimensional drawing file, wherein the object comprises a void contained within the object; (2) determining a plurality of two-dimensional line segments of the object that collectively define a boundary of the void, wherein each line segment comprises a pair of end points; (3) for each line segment determining one or more nearby line segments based on a distance between an end point of the line segment and an end point of the one or more nearby line segments being within a threshold distance; (4) determining one or more fully-connected sub-objects by connecting the linked line segments in series; (5) determining, from the one or more fully-connected sub-objects, a final sub-object to be used as a new boundary of the void; and (6) adding the final sub-object to the cross-sectional view as a new boundary of the void.

In a second aspect, disclosed herein is a computing device that includes a network interface, at least one processor, a non-transitory computer-readable medium, and program instructions stored on the non-transitory computer-readable medium that are executable by the at least one processor to cause the computing device to carry out the functions disclosed herein, including but not limited to the functions of the foregoing method.

In a third aspect, disclosed herein is a non-transitory computer-readable storage medium provisioned with software that is executable to cause a computing device to carry out the functions disclosed herein, including but not limited to the functions of the foregoing method.

One of ordinary skill in the art will appreciate these as well as numerous other aspects in reading the following disclosure.

Figure 1:
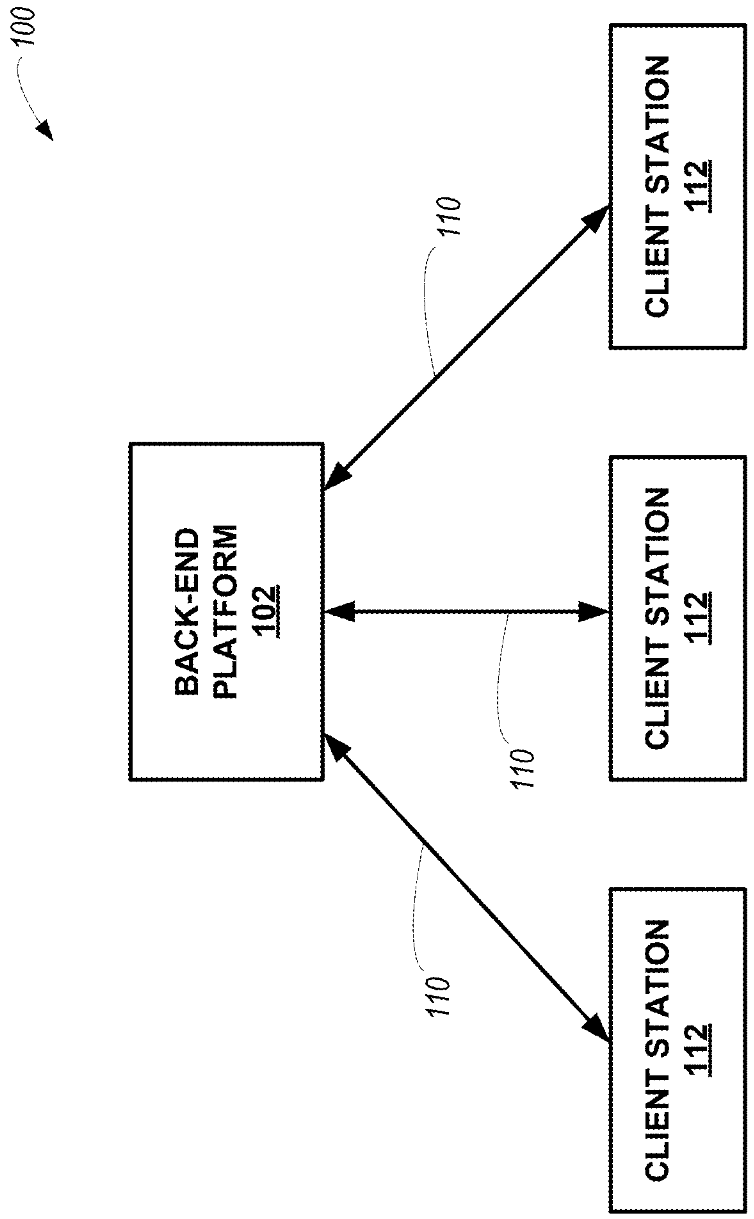
FIG. 1 depicts an example network configuration in which example embodiments may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example System Configuration

As described above, the present disclosure is generally directed to an improved software technology that facilitates the creation of a cross-sectional view from a three-dimensional drawing file such that voids within an object, such as voids in a wall or floor, are represented as separate objects that can be selected and dimensioned within the cross-sectional view.

As one possible implementation, this software technology may include both front-end software running on client stations that are accessible to individuals associated with construction projects (e.g., contractors, project managers, architects, engineers, designers, etc.) and back-end software running on a back-end platform (sometimes referred to as a "cloud" platform) that interacts with and/or drives the front-end software, and which may be operated (either directly or indirectly) by the provider of the front-end client software. As another possible implementation, this software technology may include front-end client software that runs on client stations without interaction with a back-end platform. The software technology disclosed herein may take other forms as well.

In general, such front-end client software may enable one or more individuals responsible for a construction project to perform various tasks related to the management and construction of the project, which may take various forms. According to some implementations, these tasks may include: rendering three-dimensional views of the construction project, navigating through the various three-dimensional views of the construction project in order to observe the construction project from various perspectives, using the software to generate two-dimensional drawings, which may be based on two-dimensional views of a three-dimensional drawing file, and adding dimensioning information based on receiving a series of user inputs, as some non-limiting examples. Further, such front-end client software may take various forms, examples of which may include a native application (e.g., a mobile application) and/or a web application running on a client station, among other possibilities.

Turning now to the figures, FIG. 1 depicts an example network configuration 100 in which example embodiments of the present disclosure may be implemented. As shown in FIG. 1, network configuration 100 includes a back-end platform 102 that may be communicatively coupled to one or more client stations, depicted here, for the sake of discussion, as three client stations 112.

In general, back-end platform 102 may comprise one or more computing systems that have been provisioned with software for carrying out one or more of the platform functions disclosed herein, including but not limited to functions related to the disclosed process of plotting the location of gridlines within two-dimensional views that are generated based on a three-dimensional BIM file, and then providing dynamic dimensioning information based thereon. The one or more computing systems of back-end platform 102 may take various forms and be arranged in various manners.

For instance, as one possibility, back-end platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates back-end platform 102 may either supply its own cloud infrastructure or may obtain the cloud infrastructure from a third-party provider of "on demand" computing resources, such include Amazon Web Services (AWS) or the like. As another possibility, back-end platform 102 may comprise one or more dedicated servers that have been provisioned with software for carrying out one or more of the platform functions disclosed herein. Other implementations of back-end platform 102 are possible as well.

In turn, client stations 112 may each be any computing device that is capable of running the front-end software disclosed herein. In this respect, client stations 112 may each include hardware components such as a processor, data storage, a user interface, and a network interface, among others, as well as software components that facilitate the client station's ability to run the front-end software disclosed herein (e.g., operating system software, web browser software, etc.). As representative examples, client stations 112 may each take the form of a desktop computer, a laptop, a netbook, a tablet, a smartphone, and/or a personal digital assistant (PDA), among other possibilities.

As further depicted in FIG. 1, back-end platform 102 is configured to interact with one or more client stations 112 over respective communication paths 110. Each communication path 110 between back-end platform 102 and one of client stations 112 may generally comprise one or more communication networks and/or communications links, which may take any of various forms. For instance, each respective communication path 110 with back-end platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 110 with back-end platform 102 may be wireless, wired, or some combination thereof, and may carry data according to any of various different communication protocols. Although not shown, the respective communication paths 110 with back-end platform 102 may also include one or more intermediate systems. For example, it is possible that back-end platform 102 may communicate with a given client station 112 via one or more intermediary systems, such as a host server (not shown). Many other configurations are also possible.

The interaction between client stations 112 and back-end platform 102 may take various forms. As one possibility, client stations 112 may send certain user input related to a construction project to back-end platform 102, which may in turn trigger back-end platform 102 to take one or more actions based on the user input. As another possibility, client stations 112 may send a request to back-end platform 102 for certain project-related data and/or a certain front-end software module, and client stations 112 may then receive project-related data (and perhaps related instructions) from back-end platform 102 in response to such a request. As yet another possibility, back-end platform 102 may be configured to "push" certain types of project-related data to client stations 112, such as rendered two-dimensional or three-dimensional views, in which case client stations 112 may receive project-related data (and perhaps related instructions) from back-end platform 102 in this manner. As still another possibility, back-end platform 102 may be configured to make certain types of project-related data available via an API, a service, or the like, in which case client stations 112 may receive project-related data from back-end platform 102 by accessing such an API or subscribing to such a service. The interaction between client stations 112 and back-end platform 102 may take various other forms as well.

In practice, client stations 112 may each be operated by and/or otherwise associated with a different individual that is associated with a construction project. For example, an individual tasked with the responsibility for creating project-related data, such as data files defining three-dimensional models of a construction project, may access one of the client stations 112, whereas an individual tasked with the responsibility for reviewing and revising data files defining three-dimensional models of a construction project may access another client station 112, whereas an individual tasked with the responsibility for physically constructing the elements shown in the drawings, such as an on-site construction professional, may access yet another client station 112. Client stations 112 may be operated by and/or otherwise associated with individuals having various other roles with respect to a construction project as well. Further, while FIG. 1 shows an arrangement in which three particular client stations are communicatively coupled to back-end platform 102, it should be understood that a given arrangement may include more or fewer client stations.

Although not shown in FIG. 1, back-end platform 102 may also be configured to receive project-related data from one or more external data sources, such as an external database and/or another back-end platform or platforms. Such data sources—and the project-related data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. Example Computing Device

Figure 2:
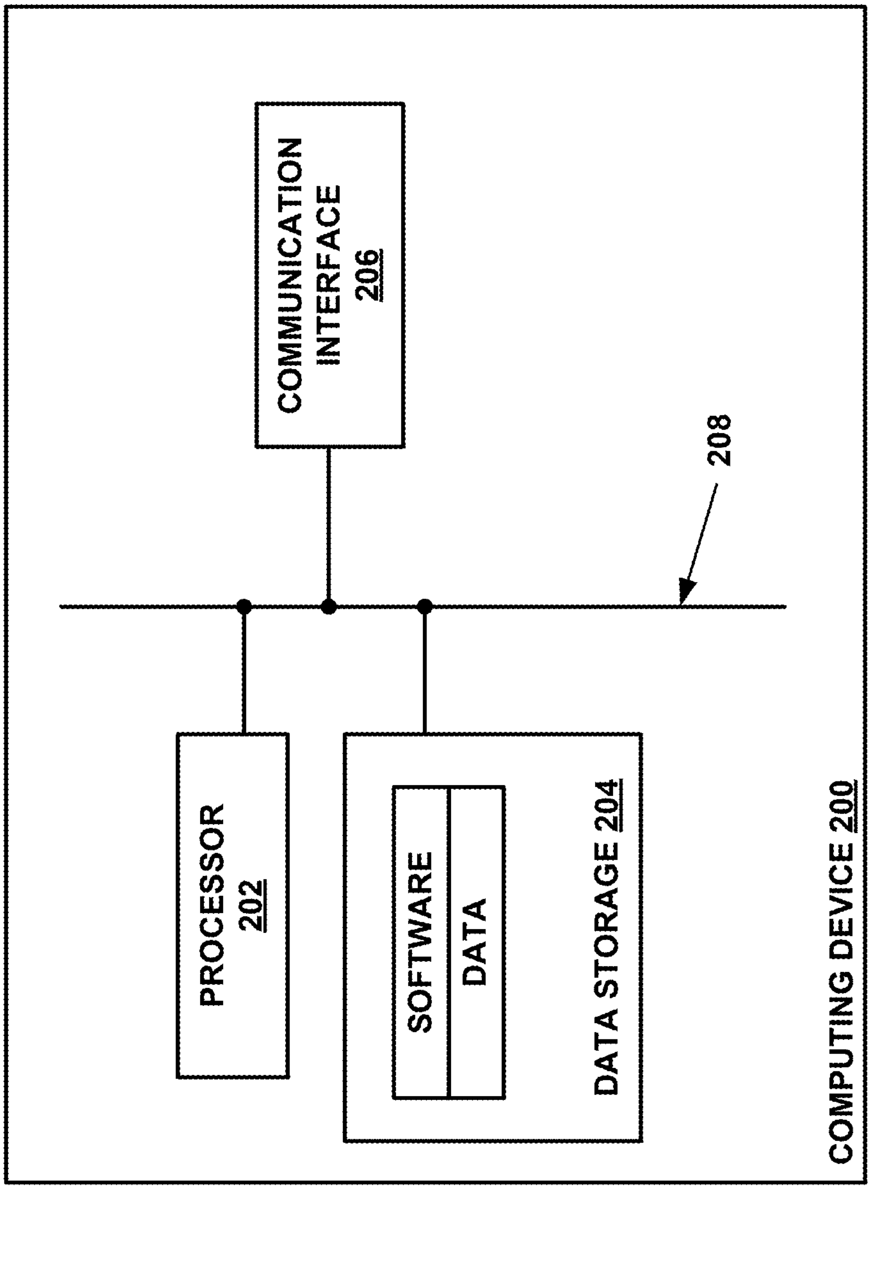
FIG. 2 depicts an example computing platform that may be configured to carry out one or more of the functions of the present disclosure.

FIG. 2 is a simplified block diagram illustrating some structural components that may be included in an example computing device 200, which could serve as, for instance, the back-end platform 102 and/or one or more of client stations 112 in FIG. 1. In line with the discussion above, computing device 200 may generally include at least a processor 202, data storage 204, and a communication interface 206, all of which may be communicatively linked by a communication link 208 that may take the form of a system bus or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the device 200 to carry out the platform-side functions disclosed herein. These software components may generally take the form of program instructions that are executable by the processor 202 to carry out the disclosed functions, which may be arranged together into software applications, virtual machines, software development kits, toolsets, or the like, all of which are referred to herein as a software tool or software tools. Further, data storage 204 may be arranged to store project-related data in one or more databases, file systems, or the like. Data storage 204 may take other forms and/or store data in other manners as well.

Communication interface 206 may be configured to facilitate wireless and/or wired communication with other computing devices or systems, such as one or more client stations 112 when computing device 200 serves as back-end platform 102, or back-end platform 102 when computing device 200 serves as one of client stations 112. Additionally, in an implementation where the computing device 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, computing device 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with computing device 200.

It should be understood that computing device 200 is one example of a computing device that may be used with the embodiments described herein. Numerous other arrangements are possible and contemplated herein. For instance, other computing devices may include additional components not pictured and/or more or fewer of the pictured components.

III. Example Three-Dimensional Drawings

As mentioned above, one way to visually represent information about a construction project is through a computerized, three-dimensional model of the construction project. In order to facilitate the creation and use of a computerized, three-dimensional model of the construction project, a team of architects, designers, and/or engineers engages in a process referred to as Building Information Modeling.

As a general matter, Building Information Modeling refers to the process of designing and maintaining a computerized representation of physical and functional characteristics of a construction project, such as a building. Specialized software tools can then access this computerized representation and process it to visually communicate how to construct the building via a navigable, three-dimensional model of the building and its infrastructure.

More specifically, but still by way of example, when architects, designers, and/or engineers engage in Building Information Modeling for a specific construction project, they generally produce what is referred to as a Building Information Model (BIM) file. In essence, a BIM file is a computerized description of the individual physical elements that comprise the construction project, such as the physical structure of the building, including walls, floors, and ceilings, as well as the building's infrastructure, including pipes, ducts, conduits, etc. This computerized description can include a vast amount of data describing the individual physical elements of the construction project and the relationships between these individual physical elements, including for instance, the relative size and shape of each element, and an indication of where each element will reside in relation to the other elements in the construction project.

BIM files can exist in one or more proprietary or open-source computer-file formats and are accessible by a range of specialized software tools. One type of specialized software tool that can access BIM files is referred to as a "BIM viewer." A BIM viewer is software that accesses the information contained within a BIM file or a combination of BIM files for a particular construction project and then, based on the file(s), is configured to cause a computing device to render a three-dimensional view of the computerized representation of the construction project. This view is referred to herein as a "three-dimensional BIM view" or simply a "three-dimensional view."

In order for BIM viewer software to be able to cause a computing device to render a three-dimensional view of the construction project, BIM files typically contain data that describes the attributes of each individual physical object (e.g., the walls, floors, ceilings, pipes, ducts, etc.) of the construction project. For instance, for an air duct designed to run across the first-floor ceiling of a building, a BIM file for the building may contain data describing how wide, how long, how high, and where, in relation to the other individual physical elements of the construction project, the duct is positioned.

There are many ways for BIM files to arrange and store data that describes the attributes of the individual physical elements of a construction project. In one specific example, BIM files may contain data that represents each individual physical object in the construction project, such as a pipe, as a mesh of geometric triangles (e.g., a triangular irregular network, or TIN) such that when the geometric triangles are visually stitched together by BIM viewer software, the triangles form a mesh or surface, which represents a scaled model of the physical object. In this respect, the BIM file may contain data that represents each triangle of a given mesh as set of coordinates in three-dimensional space ("three-space"). For instance, for each triangle stored in the BIM file, the BIM file may contain data describing the coordinates of each vertex of the triangle (e.g., an x-coordinate, a y-coordinate, and a z-coordinate for the first vertex of the triangle; an x-coordinate, a y-coordinate, and a z-coordinate for the second vertex of the triangle; and an x-coordinate, a y-coordinate, and a z-coordinate for the third vertex of the triangle). A given mesh may be comprised of thousands, tens of thousands, or even hundreds of thousands of individual triangles, where each triangle may have a respective set of three vertices and corresponding sets of three-space coordinates for those vertices. However, other ways for a BIM file to contain data that represents each individual physical object in a construction project are possible as well.

BIM files may also include data describing other attributes of the individual physical elements of the construction project that may or may not be related to the element's specific position in three-space. By way of example, this may include data describing what system or sub-system the component is associated with (e.g., structural, plumbing, HVAC, electrical, etc.), data describing what material or materials the individual physical element is made of; what manufacturer the element comes from; where the element currently resides (e.g., data indicating that the element is on a truck for delivery to the construction site, and/or once delivered, data indicating where on the construction site the delivered element resides); and/or various identification numbers assigned to the element (e.g., a serial number, part number, model number, tracking number, etc.), as well as others.

Together, these other attributes are generally referred to as metadata. BIM viewer software may utilize this metadata in various ways. For instance, some BIM viewer software may be configured to present different views based on selected metadata (e.g., displaying all meshes that represent HVAC components but hiding all meshes that represent plumbing components; and/or displaying meshes representing metal components in a certain color and displaying meshes representing wood components in another color, etc.). BIM viewers can display certain subsets of the metadata based on user input. For example, a user may provide a user input to the BIM viewer software though a click or tap on a GUI portion displaying a given mesh, and in response, the BIM viewer software may cause a GUI to display some or all of the attributes of the physical element represented by the given mesh. Other examples are possible as well.

As mentioned, BIM viewer software is generally deployed on client stations, such as client stations 112 of FIG. 1 (which, as described above, can generally take the form of a desktop computer, a laptop, a tablet, or the like). As such, construction professionals can utilize BIM viewer software during all phases of the construction project and can access a BIM file for a particular construction project in an office setting as well as on the construction site. Accordingly, BIM viewer software assists construction professionals with, among other things, the design and construction of the project and/or to identify issues that may arise during such construction.

BIM technology has advantages. For instance, as described, BIM viewers can use BIM files in order to render three-dimensional views of various elements of the construction project. This can help construction professionals identify potential construction issues prior to encountering those issues during construction as well as conceptualize what the finished building will look like.

However, existing BIM technology has certain limitations as well. One limitation is that three-dimensional BIM views may be cumbersome to navigate about and may thus not present information as quickly or efficiently as a two-dimensional technical drawing. Further, three-dimensional BIM views generally require more computing resources to render and display than traditional two-dimensional technical drawings. Additionally, while three-dimensional BIM views may display various meshes positioned about the construction project, the three-dimensional BIM view may not display precise measurements associated with each mesh in relation to other meshes or reference lines (e.g., gridlines), as doing so may tend to clutter and perhaps obscure the display of the overall project.

Accordingly, in order to view an isolated location or a particular set of objects within the three-dimensional drawing file, a construction professional may utilize a software tool that is configured to generate a cross-sectional view of the three-dimensional drawing file along a reference plane of the construction professional's choosing. In this regard, the cross-sectional view may be generated in various ways. For instance, in some implementations, the plane that is used as a reference for generating the cross-sectional view may have a nominal thickness and the software tool may trace the individual portions of each mesh (e.g., segments of individual geometric triangles) that pass through the plane. Other implementations are also possible.

In this way, the construction professional may select a wall or floor within the three-dimensional drawing file and thereby generate a cross-sectional view along the face of the selected wall or floor. The cross-sectional view will include a representation of any objects that intersect the face of the selected object. Further, the cross-sectional view will include a representation of any voids, or holes, in the selected object that are designed to allow the intersecting object to pass through the selected wall or floor. Generally speaking, these types of voids, which are sometimes also referred to as blockouts, will tend to be slightly larger than the objects that will pass through them, to allow for some clearance during construction.

In practice, these types of voids can be implemented in various ways during construction. As one example, an object may be installed without any voids included (e.g., a section of drywall), and then the voids may be cut into the installed object at the designated location. As another example, the voids may be incorporated into the structural design and thus the installation of an object. For instance, consider a concrete floor slab through which several vertically oriented pipes will pass. The steel reinforcing of the floor slab will be designed around the locations of the pipes. Further, a form insert may be used when the concrete floor slab is poured, which can then be moved once the concrete is cured, leaving the void for the later-installed pipe to pass therethrough. Other examples are also possible.

Regardless of how these types of voids are incorporated into a given object in practice during construction, it will be appreciated that accurately locating each void within the given object is highly important. If an object is constructed and the void is placed in the wrong location, it may lead to time-consuming and costly rework that may include patching voids that were placed in the wrong location, removing and replacing unusable wall sections, cutting new holes through a wall or concrete floor, and/or relocating the pipes or other intersecting objects to align with the misplaced voids. Further, all of the changes noted above may have a rippling effect on the surrounding objects in the construction project, necessitating additional rework and compounding the time and cost required to address the issue.

Figure 3:
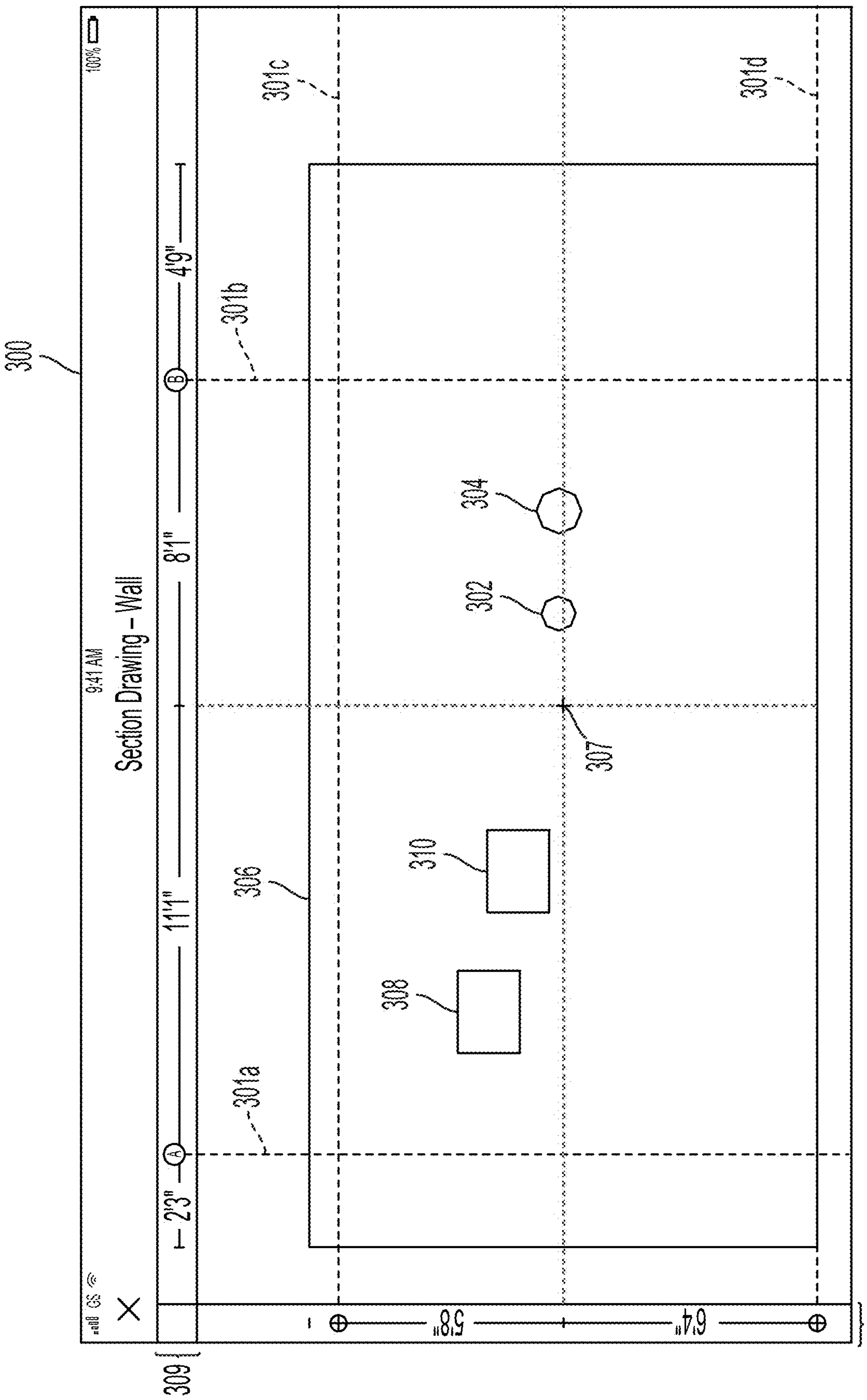
FIG. 3 depicts an example cross-sectional view of a three-dimensional drawing file.

FIG. 3 depicts an example of a cross-sectional view 300 of a three-dimensional drawing file. For example, the cross-sectional view 300 may represent a cross-section of the three-dimensional drawing file along a plane that includes the face of a wall 306. Several voids in the wall 306 are shown as two-dimensional shapes, such as a void 302 that may represent a hole for a first pipe to pass through the wall 306, a void 304 that may represent a hole for a second pipe, a void 308 that may represent a hole for a first air duct, and a void 310 that may represent a hole for a second air duct.

Further, the cross-sectional view 300 includes several gridlines 301*a*, 301*b*, 301*c*, and 301*d* that represent project-specific, pre-defined reference lines from which dimensions may be measured to locate a given object in the cross-sectional view 300. To this end, cross-sectional view 300 may include a horizontal dimensioning reference bar 309 located across the top of the view and a vertical dimensioning reference bar 311 located along the left side of the view. In some implementations, the software tool for generating the cross-sectional view 300 may automatically populate the dimensioning reference bars with dimensioning information relating to the objects in the view when the cross-sectional view 300 is created. Additionally or alternatively, dimensioning information for a particular object in the view may be added based on receiving an input indicating a user selection of the particular object in the cross-sectional view 300. As shown in FIG. 3, the cross-sectional view 300 includes dimensioning information relating to the wall 306, including dimensions from the respective gridlines to the edges and center of the wall 306.

A construction professional may wish to use the cross-sectional view 300 to generate dimensioning information for one of the voids shown in the view, so that the void can be accurately located during construction. However, as noted above, current software tools for generating cross-sectional views from three-dimensional drawing files as shown in FIG. 3 do not provide for this capability, as the voids within wall 306 are not treated in the cross-sectional view 300 as unique, selectable objects. Rather, each of the voids is formed (e.g., during a tracing operation) from a collection of line segments that are all treated as components of the wall 306. Accordingly, current software tools will create a bounding rectangle around the extents of the wall 306, which provides the basis for calculating dimensioning information to the edges and a center 307 of the wall 306, but which ignores the voids within the interior of the wall 306.

Further, because of the way the voids are defined during generation of the cross-sectional view 300, it may not be a straightforward process to generate a unique object corresponding to the boundary of a given void. For instance, the boundary of each void may be defined by a plurality of line segments that represent the portions of the mesh (e.g., portions of individual geometric triangles) that were traced from the three-dimensional drawing file to create the cross-sectional view 300. In this regard, the plurality of line segments may include numerous two-dimensional vectors that have various different lengths, are overlapping with each other to various degrees, and are arranged in different orientations. Thus, determining a single closed path among these numerous line segments to generate a unique object that defines a boundary for each void can be a challenging task.

Figure 4:
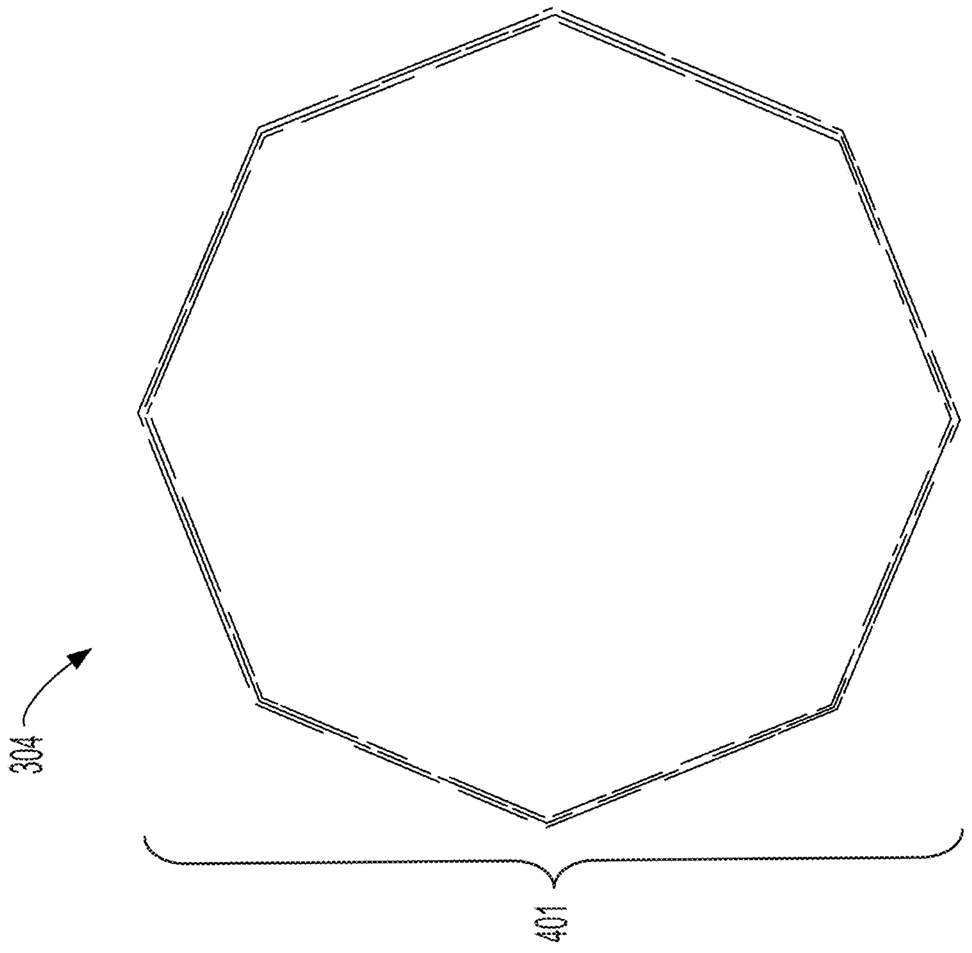
FIG. 4 depicts a schematic diagram of a plurality of line segments defining a void in the cross-sectional view shown in FIG. 3.

To illustrate with an example, FIG. 4 depicts a close-up, schematic diagram of the void 304 shown in FIG. 3. As shown, a plurality of line segments 401 collectively define a boundary of the void 304. In this regard, it should be understood that although the plurality of line segments 401 are shown in FIG. 4 as slightly offset from one another, this is for purposes of illustration only, to provide a sense of the fragmented arrangement of the segments. In practice, the plurality of line segments 401 shown in FIG. 4 would be stacked on top of each other, overlapping to collectively define what appears to be a continuous two-dimensional boundary for the void 304 shown in the cross-sectional view 300. Further, a given void may include significantly more overlapping line segments than the schematic example shown in FIG. 4.

IV. Example Operations

To help remedy some of the aforementioned limitations, disclosed herein is a new technology that facilitates determining, from a plurality of line segments that collectively define a boundary of a given void, a unique object that defines a new boundary for the void that is selectable within a cross-sectional view of a three-dimensional drawings file. Further, this may allow a software tool utilizing the new technology to create a bounding rectangle around the void, which may provide a basis for determining dimensioning information related to the void.

Example operations that may be carried out by one or more computing devices running a software application that utilizes the disclosed technology are discussed in further detail below. For purposes of illustration only, these example operations are described as being carried out by a computing device, such as computing device 200 of FIG. 2. As described above, the computing device 200 may serve as one or more of client stations 112 and/or back-end platform 102 shown in FIG. 1. In this respect, it should be understood that, depending on the implementation, the operations discussed herein below may be carried out entirely by a single computing device, such as one or more of client stations 112 or by back-end platform 102, or may be carried out by a combination of computing devices, with some operations being carried out by back-end platform 102 (such as computational processes and data-access operations) and other operations being carried out by one or more of client stations 112 (such as display operations and operations that receive user inputs). However, other arrangements are possible as well.

Figure 5:
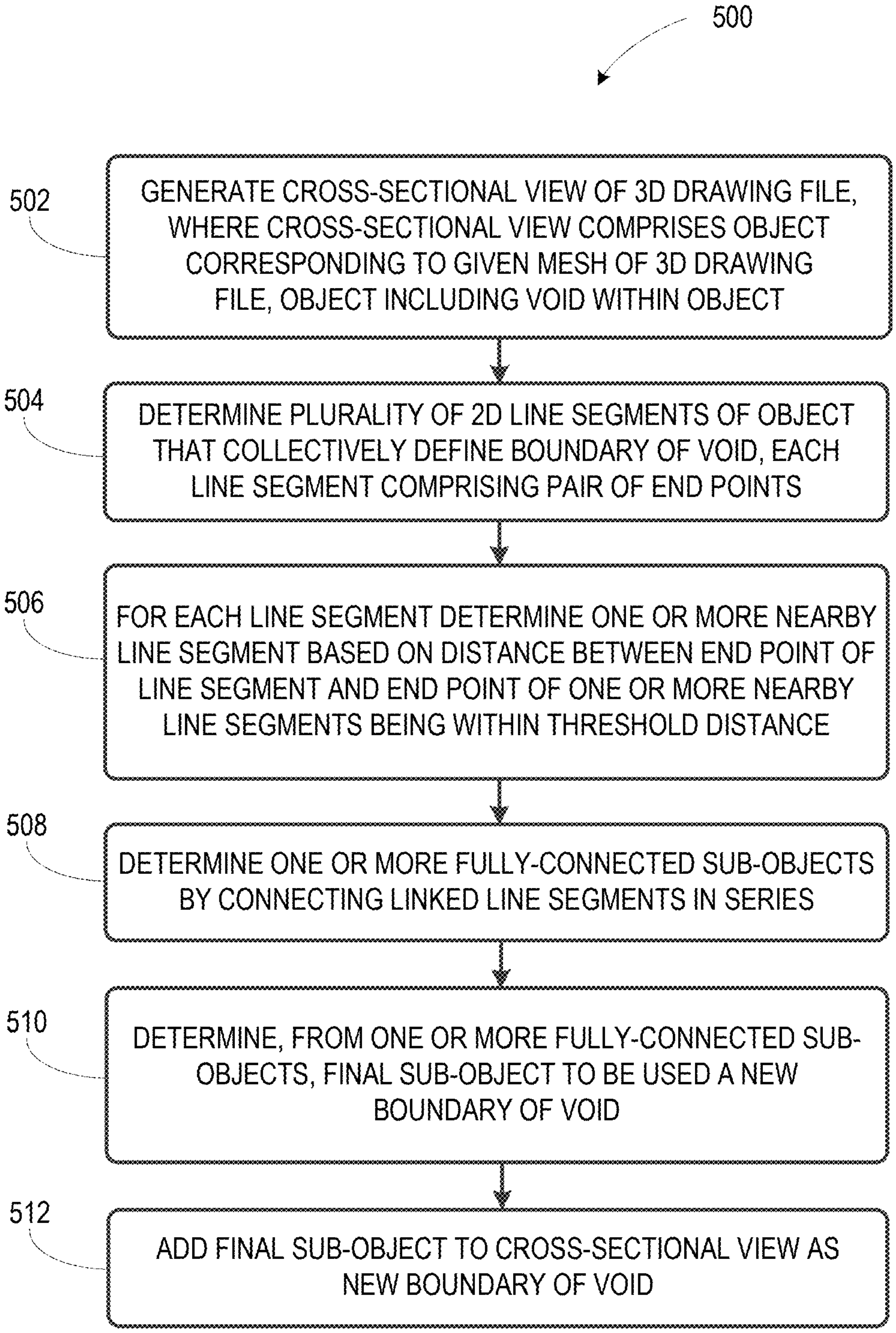
FIG. 5 depicts an example flow chart that may be carried out to facilitate connecting line segments to form a sub-object in a cross-sectional view of a three-dimensional drawing file.

To help describe some of these operations, the flow diagram 500 of FIG. 5 may also be referenced to describe combinations of operations that may be performed by a computing device. In some cases, a block in the flow diagram may represent a module or portion of program code that includes instructions that are executable by a processor to implement specific logical functions or steps in a process. The program code may be stored on any type of computer-readable medium, such as non-transitory computer readable media (e.g., data storage 204 shown in FIG. 2). In other cases, a block in the flow diagram may represent circuitry that is wired to perform specific logical functions or steps in a process. Moreover, the blocks shown in the flow diagram may be rearranged into different orders, combined into fewer blocks, separated into additional blocks, and/or removed, based upon the particular embodiment. The flow diagram may also be modified to include additional blocks that represent other functionality that is described expressly or implicitly elsewhere herein.

With reference now to flow diagram 500 of FIG. 5, one example of a set of operations that may be carried out in accordance with the disclosed technology is illustrated and described. In practice, the operations shown in FIG. 5 may be commenced while the computing device is presenting a view of a three-dimensional drawing file via a GUI. For instance, the computing device may receive an indication that a user has requested creation of a cross-sectional view at a particular location within the three-dimensional drawing file. However, other ways to commence the operations shown in FIG. 5 are possible as well.

At block 502, a computing device, such as the computing device 200 shown in FIG. 2, may generate a cross-sectional view of a three-dimensional drawing file. For instance, like the view shown in FIG. 3, the cross-sectional view may include an object, such as a wall, that corresponds to a given mesh of the three-dimensional drawing file. Further, the object representing the wall may include a void that is contained within the object and is provided to allow another object (e.g., a pipe, a duct) to pass through the wall.

At block 504, the computing device 200 may determine a plurality of two-dimensional line segments of the object that collectively define a boundary of the void. In this regard, each line segment in the plurality of two-dimensional line segments may include a pair of end points. For instance, each line segment may take the form of a vector that includes a starting point and an ending point and has an associated direction. The plurality of two-dimensional line segments determined at block 504 may resemble the plurality of line segments 401 shown in FIG. 4, although other examples are also possible, including for other voids that may have a different shape.

The computing device 200 may perform various operations with respect to the plurality of line segments that collectively define the boundary of the void. As one possibility, the computing device 200 may remove any line segments (e.g., by deleting them from the cross sectional view) that are not unique. In some embodiments, the computing device 200 may identify non-unique line segments based on a comparison of the end points between each pair of line segments. If the end points of the two line segments are the same, or similar to each other within a certain threshold, the computing device may determine that one of the line segments may be discarded, as it is effectively a duplicate line segment. As another possibility, the computing device 200 may sort the plurality of segments by calculating the dot product of each line segment's starting and ending point, which yields a scalar value by which the line segments may be compared and sorted, which may reduce unnecessary recursion during the subsequent linking operations discussed below. The line segments may be sorted using other approaches as well.

As yet another possibility, the computing device 200 may define an object class for the plurality of two-dimensional line segments that is different than an object class that is associated with the object (i.e., a wall class). For example, the computing device 200 may define a void class and may assign each of the line segments to the void class to distinguish them from the wall. As another example, the computing device 200 may define an object sub-class that is separate from the wall class, but nonetheless still retains an association with the wall class. Other operations that may prepare the plurality of two-dimensional line segments for further processing are also possible.

At block 506, the computing device 200 may determine which line segments have corresponding end points that are near each other, and which may be connected to begin forming a single, continuous boundary for the void. This process may be carried out in various ways. For example, for each line segment in the plurality of two-dimensional line segments, the computing device 200 may determine one or more nearby line segments based on a distance between an end point (e.g., either end point) of the line segment and an end point (e.g., either end point) of the one or more nearby line segments being within a threshold distance (e.g., within a precision of 0.001). Thus, the computing device 200 may determine, for every line segment, each of the possible links that might be followed from the line segment in either direction (i.e., starting from either end point) to potentially form a continuous boundary for the void.

Based on the above, it will be recognized that each line segment that is determined to be nearby a first line segment might have its own branching collection of nearby line segments that represent possible next links in a potential boundary. On the other hand, the computing device 200 may determine that some line segments in the plurality of two-dimensional line segments do not have any nearby line segments in one or both directions, because one or both end points of the line segment are not sufficiently nearby an end point of any other line segment.

Based on the set of all of the possible links, for all line segments, determined at block 506, the computing device 200 may recursively follow every combination of linked line segments in each direction to thereby determine one or more sets of line segments that fully connect to form a continuous sub-object. Accordingly, at block 508, the computing device 200 may determine one or more fully-connected sub-objects by progressively connecting respective sets of nearby line segments in series.

In this regard, some of the possible combinations of linked line segments might not form a fully-connected sub-object that defines the entire boundary of the void. This may occur for various reasons. For example, a given combination of linked line segments might not form a fully-connected sub-object at all, because one or more of the line segments in the set might not be linked with any other line segment in a given direction, resulting in a discontinuity. As another example, a given combination of linked line segments might form a fully-connected sub-object, but the fully-connected sub-object might double back and overlap with itself (e.g., based on the overlap of its component line segments) rather than proceeding in the same direction around the boundary of the void. Other examples are also possible.

At block 510, after each combination of linked line segments is considered, the computing device 200 may determine, from the set of one or more fully-connected sub-objects, a final sub-object that will be used as a new, selectable boundary for the void in the cross-sectional view. For instance, the computing device may be configured to discard any incomplete sub-objects, as well as any fully-connected sub-objects that do not encompass the entire boundary of the void. Still further, the computing device 200 might determine, at block 508, more than one fully-connected sub-object the encompasses most or all of the boundary of the void, and thus the computing device 200 may be configured to discard duplicate objects. The computing device 200 may determine the final sub-object in various ways. As one possibility, the computing device 200 may determine, from the one or more fully-connected sub-objects, a final sub-object having a largest number of overlapping boundaries with other fully-connected sub-objects. Other approaches for determining the final sub-object are also possible.

At block 512, the computing device 200 may add the final sub-object to the cross-sectional view as a new boundary of the void. In addition, as noted above, the computing device 200 may discard all other fully-connected and incomplete sub-objects and their component line segments. As a result, the void may now be selectable within the cross-sectional view separately from the wall of which it is a part. Further, the computing device 200 may define a bounding rectangle for the void that encompasses the new boundary, which may provide a basis for determining dimensioning information related to the void.

Figure 6:
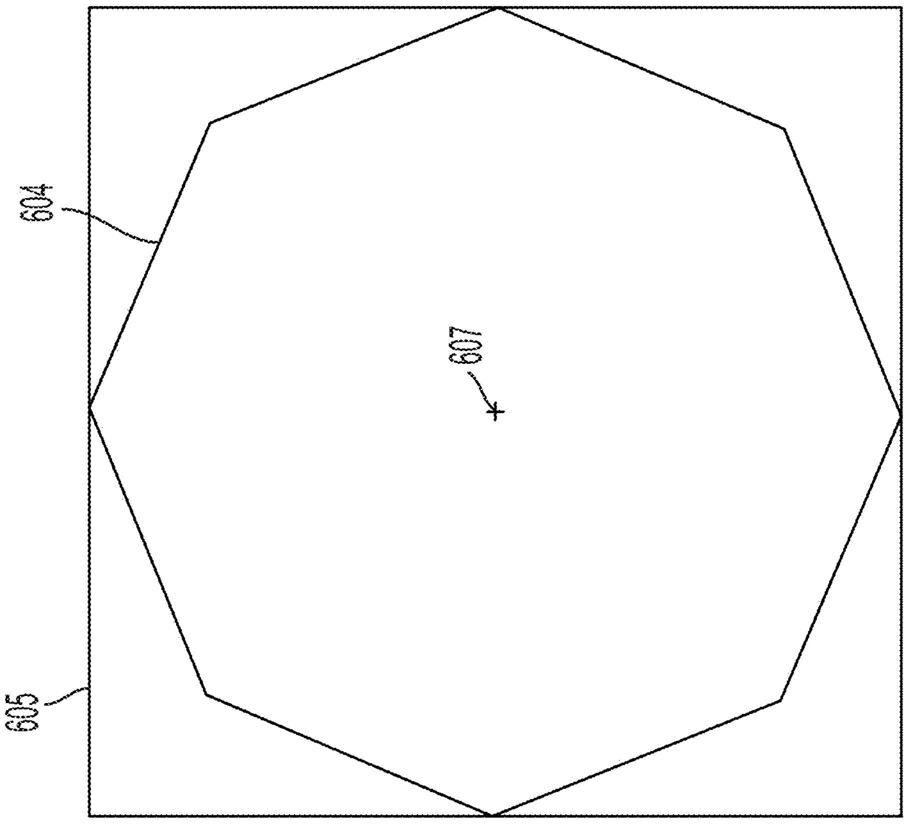
FIG. 6 depicts an example of a fully-connected sub-object formed in accordance with one embodiment of the present disclosure.

To illustrate with an example, FIG. 6 depicts a final, fully-connected sub-object 604 that may be determined by the computing device 200 for the void 304 that was shown in FIG. 3. For instance, the computing device 200 may determine the final sub-object 604 by progressively connecting a set of nearby line segments from the plurality of line segments 401, as discussed above. Further, FIG. 6 also illustrates a bounding rectangle 605 that may be defined by the computing device 200 to encompass the new boundary of the void and provide the basis for dimensions to both the vertical and horizontal edges void, as well as center 607 of the void (e.g., which may correspond to the center of the bounding rectangle).

Figure 7:
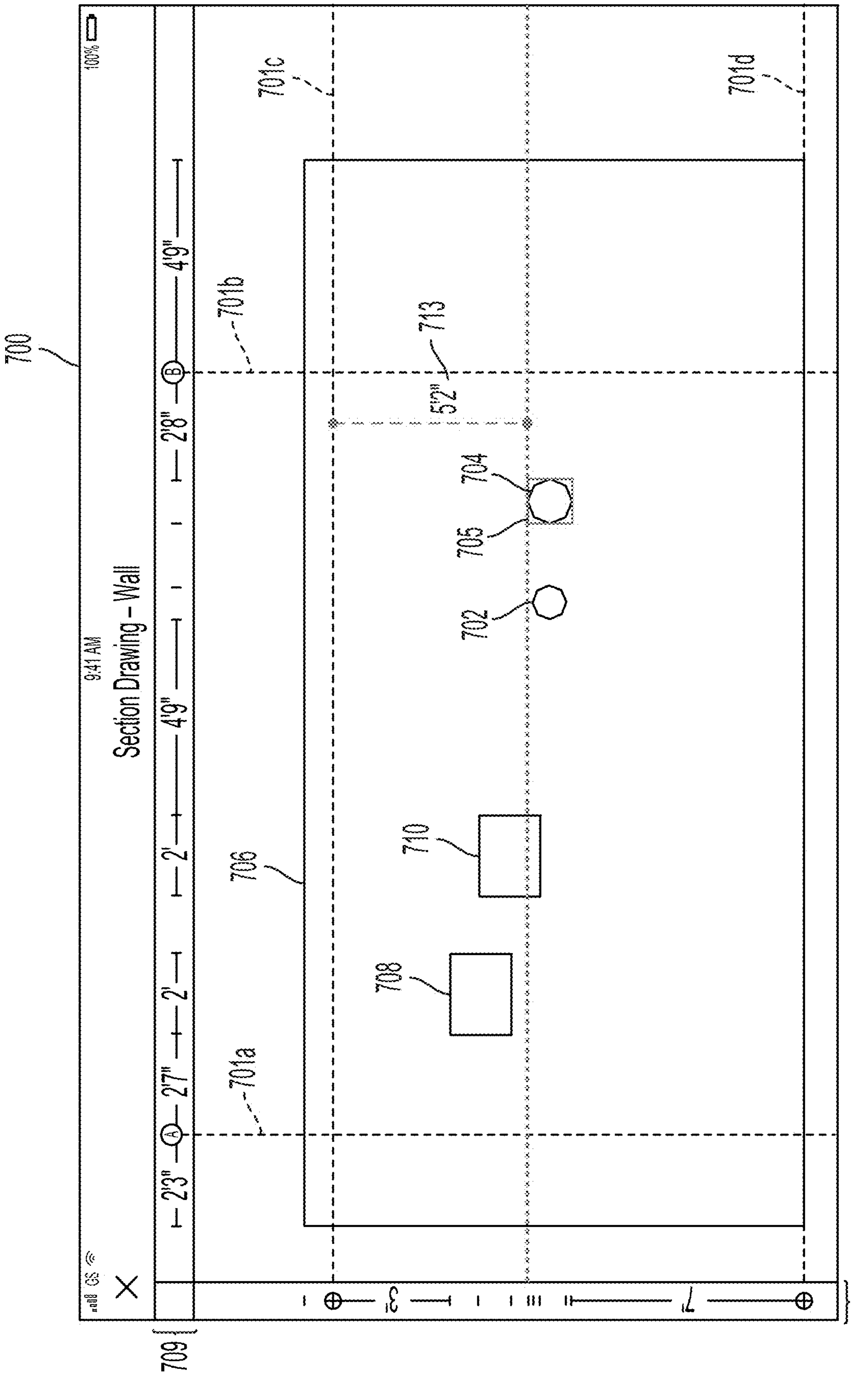
FIG. 7 depicts another example cross-sectional view of a three-dimensional drawing file, in accordance with one embodiment of the present disclosure.

Turning to FIG. 7, an example of a cross-sectional view of a three-dimensional drawing file is depicted. In this regard, the cross-sectional view 700 shown in FIG. 7 may be similar to the view shown FIG. 3, but with the advantages of the embodiments discussed herein. For example, the cross-sectional view 700 may represent a cross-section of the three-dimensional drawing file along a plane that includes the face of a wall 706. As in FIG. 3, several voids in the wall 706 are shown as two-dimensional shapes, such as a void 702 that may represent a hole for a first pipe to pass through the wall 706, a void 704 that may represent a hole for a second pipe, a void 708 that may represent a hole for a first air duct, and a void 710 that may represent a hole for a second air duct.

Further, the cross-sectional view 700 includes several gridlines 701*a*, 701*b*, 701*c*, and 701*d*, similar to the gridlines shown in FIG. 3, that represent project-specific, pre-defined reference lines from which dimensions may be measured to locate a given object in the cross-sectional view 700. To this end, cross-sectional view 700 may include a horizontal dimensioning reference bar 709 located across the top of the view and a vertical dimensioning reference bar 711 located along the left side of the view. However, whereas the view shown in FIG. 3 did not include any dimensioning information related to the voids for the reasons discussed above, the horizontal and vertical dimensioning reference bars in FIG. 7 include dimensioning information for each of the voids because a computing device (e.g., the computing device 200) applied the operations discussed above to determine a new boundary for each void.

In addition to the automatically-generated dimensioning information shown in the horizontal and vertical dimensioning reference bars in FIG. 7, each void may also be selectable by a user within the cross-sectional view 700 to determine more specific dimensions that may be desired. In this regard, the respective bounding rectangle for each void the provides the basis for dimensions may be hidden from view until a user selects the void. As shown in FIG. 7, a user has selected the void 704 to generate a dimension 713 (i.e., a distance of 5'2") between the top edge of the void 704 and the upper gridline 701*c*. The user selection caused the bounding rectangle 705 associated with the void 704 to appear. Similarly, the center of the void 704, which is not shown in FIG. 7, may appear if the user makes a selection to generate a dimension to the center of the void 704. Various other examples are also possible.

Although the examples discussed above with respect to FIGS. 3-7 generally involved voids in a wall, it will be understood that the features disclosed herein may be used for various other applications in a given construction project as well (e.g., floors, foundations, ceilings, roofs, etc.).

V. Conclusion

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "users" or other entities, this is for purposes of example and explanation only. Claims should not be construed as requiring action by such actors unless explicitly recited in claim language.

The invention claimed is:

1. A computing device comprising:
at least one processor;
a non-transitory computer-readable medium; and
program instructions stored on the non-transitory computer-readable medium that, when executed by the at least one processor, cause the computing device to:
generate a cross-sectional view of a three-dimensional drawing file, wherein the cross-sectional view comprises an object and a void contained within the object;
determine a plurality of two-dimensional line segments that collectively define an initial boundary of the void, wherein each line segment comprises a pair of end points;
for each respective line segment of the plurality of two-dimensional line segments, determine one or more nearby line segments based on a distance between an end point of the respective line segment and an end point of the one or more nearby line segments being within a threshold distance;
determine one or more fully-connected sub-objects by connecting respective sets of nearby line segments in series;
determine, from the one or more fully-connected sub-objects, a final sub-object that defines a new boundary of the void;
add the final sub-object to the cross-sectional view; and
remove, from the cross-sectional view, at least one sub-object that is not the final sub-object.

2. The computing device of claim 1, wherein removing the at least one sub-object that is not the final sub-object comprises removing, from the cross-sectional view, at least one fully-connected sub-object that is not the final sub-object.

3. The computing device of claim 1, wherein removing the at least one sub-object that is not the final sub-object comprises removing, from the cross-sectional view, at least one sub-object that is not fully connected.

4. The computing device of claim 1, wherein determining the final sub-object that defines the new boundary of the void comprises determining that the final sub-object has a largest number of overlapping boundaries with other fully-connected sub-objects.

5. The computing device of claim 1, further comprising program instructions stored on the non-transitory computer-readable medium that, when executed by the at least one processor, cause the computing device to:
define an object class for the plurality of two-dimensional line segments, wherein the defined object class is different than an object class that is associated with the object.

6. The computing device of claim 1, wherein the plurality of two-dimensional line segments comprises two-dimensional line segments that (i) have differing lengths and (ii) are overlapping.

7. The computing device of claim 1, wherein the plurality of two-dimensional line segments comprises a first line segment and a second line segment, the computing device further comprising program instructions stored on the non-transitory computer-readable medium that, when executed by the at least one processor, cause the computing device to:
after determining the plurality of two-dimensional line segments:
compare a pair of end points of the first line segment with a pair of end points of the second line segment;
based on the comparison, determine that the first line segment is not unique; and
remove the first line segment from the plurality of two-dimensional line segments.

8. The computing device of claim 1, wherein the initial boundary of the void is not selectable within the cross-sectional view, and wherein the final sub-object that defines the new boundary of the void is selectable within the cross-sectional view.

9. The computing device of claim 1, wherein the three-dimensional drawing file corresponds to a construction project, and wherein the object corresponds to a wall or a floor associated with the construction project.

10. The computing device of claim 9, wherein the void contained within the object corresponds to a pipe or a duct that passes through the object.

11. A non-transitory computer-readable medium, wherein the non-transitory computer-readable medium is provisioned with program instructions that, when executed by at least one processor, cause a computing device to:
generate a cross-sectional view of a three-dimensional drawing file, wherein the cross-sectional view comprises an object and a void contained within the object;
determine a plurality of two-dimensional line segments that collectively define an initial boundary of the void, wherein each line segment comprises a pair of end points;
for each respective line segment of the plurality of two-dimensional line segments, determine one or more nearby line segments based on a distance between an end point of the respective line segment and an end point of the one or more nearby line segments being within a threshold distance;
determine one or more fully-connected sub-objects by connecting respective sets of nearby line segments in series;
determine, from the one or more fully-connected sub-objects, a final sub-object that defines a new boundary of the void;
add the final sub-object to the cross-sectional view; and
remove, from the cross-sectional view, at least one sub-object that is not the final sub-object.

12. The non-transitory computer-readable medium of claim 11, wherein removing the at least one sub-object that is not the final sub-object comprises removing, from the cross-sectional view, at least one fully-connected sub-object that is not the final sub-object.

13. The non-transitory computer-readable medium of claim 11, wherein removing the at least one sub-object that is not the final sub-object comprises removing, from the cross-sectional view, at least one sub-object that is not fully connected.

14. The non-transitory computer-readable medium of claim 11, wherein determining the final sub-object that defines the new boundary of the void comprises determining that the final sub-object has a largest number of overlapping boundaries with other fully-connected sub-objects.

15. The non-transitory computer-readable medium of claim 11, wherein the plurality of two-dimensional line segments comprises two-dimensional line segments that (i) have differing lengths and (ii) are overlapping.

16. The non-transitory computer-readable medium of claim 11, wherein the plurality of two-dimensional line segments comprises a first line segment and a second line segment, and wherein the non-transitory computer-readable medium is further provisioned with program instructions that, when executed by at the least one processor, cause the computing device to:

after determining the plurality of two-dimensional line segments:

compare a pair of end points of the first line segment with a pair of end points of the second line segment;

based on the comparison, determine that the first line segment is not unique; and remove the first line segment from the plurality of two-dimensional line segments.

17. The non-transitory computer-readable medium of claim 11, wherein the initial boundary of the void is not selectable within the cross-sectional view, and wherein the final sub-object that defines the new boundary of the void is selectable within the cross-sectional view.

18. A method carried out by a computing device, the method comprising:

generating a cross-sectional view of a three-dimensional drawing file, wherein the cross-sectional view comprises an object and a void contained within the object;

determining a plurality of two-dimensional line segments that collectively define an initial boundary of the void, wherein each line segment comprises a pair of end points;

for each respective line segment of the plurality of two-dimensional line segments, determining one or more nearby line segments based on a distance between an end point of the respective line segment and an end point of the one or more nearby line segments being within a threshold distance;

determining one or more fully-connected sub-objects by connecting respective sets of nearby line segments in series;

determining, from the one or more fully-connected sub-objects, a final sub-object that defines a new boundary of the void;

adding the final sub-object to the cross-sectional view; and removing, from the cross-sectional view, at least one sub-object that is not the final sub-object.

19. The method of claim 18, wherein removing the at least one sub-object that is not the final sub-object comprises removing, from the cross-sectional view, at least one fully-connected sub-object that is not the final sub-object.

20. The method of claim 18, wherein removing the at least one sub-object that is not the final sub-object comprises removing, from the cross-sectional view, at least one sub-object that is not fully connected.

* * * * *